July 2, 1929.  J. J. RITTER  1,719,236
WINDOW SCREEN
Filed March 12, 1928
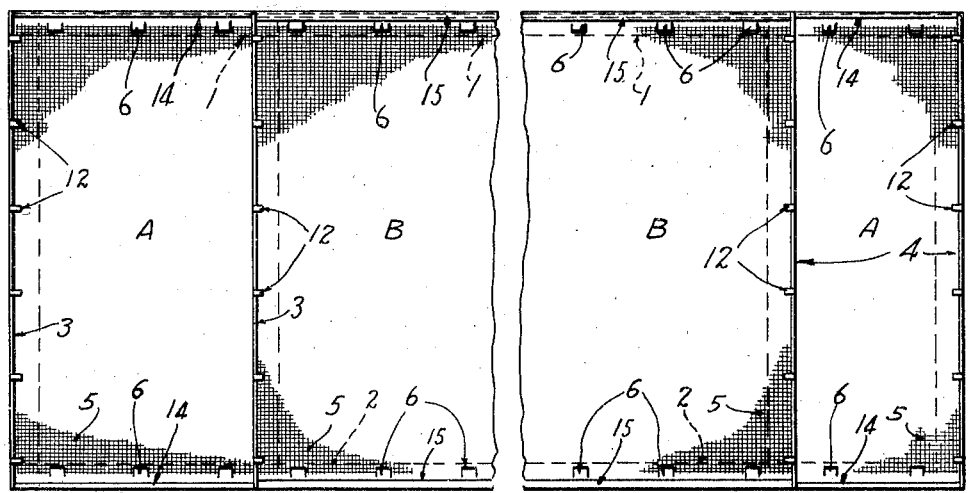
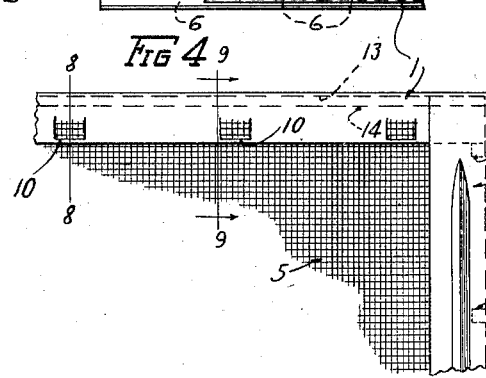
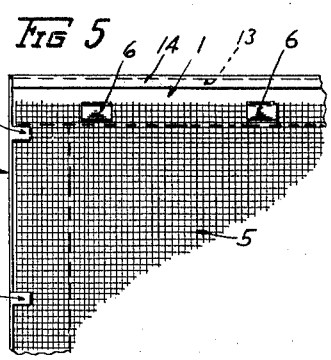
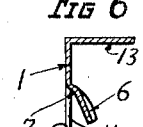
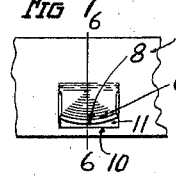
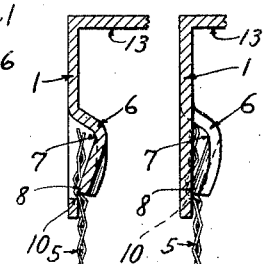
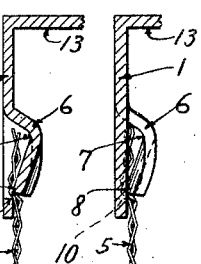
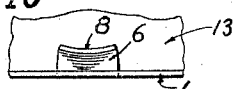
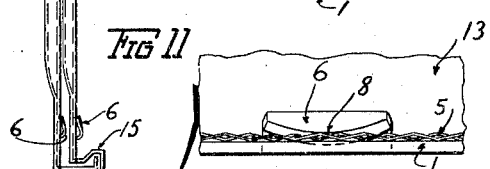
Inventor
John J. Ritter
By Staley & Welch
Attorneys Patented July 2, 1929.

1,719,236

UNITED STATES PATENT OFFICE.

JOHN J. RITTER, OF URBANA, OHIO, ASSIGNOR TO THE W. B. MARVIN MANUFACTURING COMPANY, OF URBANA, OHIO, A CORPORATION OF OHIO.

WINDOW SCREEN.

Application filed March 12, 1928. Serial No. 260,997.

This invention relates to window screens, it more particularly relating to a screen employing wire mesh stretched over a metal frame.

The object of this invention is to provide improved means for securing the wire mesh to the frame.

A more specific object is to provide for securing the wire mesh to the metal frame by a series of tongues cut and bent from the frame so formed as to secure the wire mesh firmly in position without damage thereto.

In the accompanying drawings:

Fig. 1 is an elevation of the rear side of a screen embodying the improvements, the screen in this case being formed of two frames covered with wire mesh telescoping one with the other.

Fig. 2 is an end view.

Fig. 3 is a top plan view of a portion of the same.

Fig. 4 is a front elevation of a portion of one of the frames.

Fig. 5 is a rear elevation of a portion of one of the frames.

Fig. 6 is a section on the line 6—6 of Fig. 7.

Fig. 7 is an enlarged view of one of the frames and one of the securing tongues.

Fig. 8 is an enlarged section on the line 8—8 of Fig. 4.

Fig. 9 is an enlarged section on the line 9—9 of Fig. 4.

Fig. 10 is a view looking from the bottom of Fig. 7.

Fig. 11 is a view looking from the bottom of Fig. 9.

Referring to the drawings, each section of the screen is formed of a frame, one indicated at A and the other at B, of sheet metal. Each frame is formed with two longitudinal top and bottom strips 1 and 2 connected by vertical strips 3 and 4, the strips being connected together by spot welding or in any other suitable manner to form rectangular shaped frames over which the wire mesh 5 is stretched and secured.

The improvement relates to the manner in which the wire mesh is secured to the longitudinal strips. Each longitudinal strip is punched to form a series of tongues 6, the punchings forming openings in the strips 1 having straight vertical sides and a straight lower edge with the tongues projecting from the upper edge. Heretofore in securing wire mesh to metal frames by integral tongues struck from the frame it has been the usual practice to first bend the tongues away from the frame, insert the edges of the mesh beneath the tongues and then bend the tongues back to the original position to clamp the edges of the screen in position. This has resulted, however, in many instances in the edges of the tongues coacting with the edges of the openings formed by the punching operation to shear the wire mesh at those points. To overcome this difficulty, each tongue in the present case has been so formed that when the tongue is bent back to clamping position its edges stand away from the edges of the opening and the tongue engages the wire mesh only at one point, that point being at the top of the tongue which is removed from the adjacent edge of the opening so that no shearing action can take place. To that end the tongue is bent so it forms an obtuse angle as indicated at 7 in Figs. 8 and 9, and the outer portion thereof is also bent so that it will be of a slightly concavo-convex form so as to provide a rounded central nose as indicated at 8. The result of this is that when the tongue is pushed to clamping position the rounded nose 8 only engages the wire mesh, this point of engagement being at a place removed from the lower edge 10 of the opening 11 as shown best in Fig. 8. As shown best in Figs. 9 and 11, the side edges of the tongue will be completely out of engagement with the wire mesh so that no shearing action between the side edges of the tongue and the side edges of the opening can take place.

By this arrangement the wire mesh is securely fastened in position to the metal frames in a manner which will eliminate all danger of the mesh being sheared or severed by the tongues when the tongues are bent to clamping position.

The ends of the wire mesh are secured to the ends 3 and 4 of the frame by small lugs 12 formed integrally with the outer edge of each end frame piece, which lugs are bent over the ends of the sheet of wire mesh as shown.

The tongues 6 it will be seen are struck from an intermediate portion of each of the longitudinal frame pieces 1 and 2 which leaves the outer edges of each of these frame pieces free to be formed as shown in Fig. 2 so that the frames can be slidably connected together. It will be observed that the outer edge of each of the longitudinal frame members 1 and 2 of the frame A is bent at right angles to form a flange 13, the outer edge of the flange being bent inwardly to form a tongue 14. The outer edge of each of the longitudinal frame members 1 and 2 of the frame B is bent to form a channel 15 to receive the tongue 14. This peculiar manner of slidably connecting the frame members together is shown and described more fully in my pending application Serial No. 216,473 filed April 30, 1927.

Having thus described my invention I claim:

1. A screen sash formed of strips of sheet metal having integral tongues punched from the metal of two opposite sides thereof to secure wire mesh to said sash, each tongue being shaped such that its edges, when the tongue is in clamping position, will lie in spaced relation with the walls of the opening formed by the punching operation, with the tip of the tongue only engaging the wire mesh and clamping the same to the frame.

2. A screen sash formed of strips of sheet metal having integral tongues punched from the metal of two opposite sides thereof to secure wire mesh to said sash, each tongue being bent to concavo-convex form in cross-section and also bent near its base at an obtuse angle whereby its edges, when said tongue is in clamping position, will lie in spaced relation with the walls of the opening formed by the punching operation, with the central portion only of the tip of the tongue engaging the wire mesh and clamping the same to the frame.

3. A screen sash formed of strips of sheet metal having integral tongues punched from the metal of two opposite sides thereof to secure wire mesh to said sash, each tongue being bent to concavo-convex form in cross-section with the face adjacent the wire mesh convex and the opposite face concave and also bent near its base at an obtuse angle, whereby its side edges and tip, when said tongue is in clamping position, will be in spaced relation with the walls of the opening formed by the punching operation, with the tip of the tongue engaging the wire mesh and clamping the same to the frame.

4. A screen sash formed of strips of sheet metal presenting vertical faces, integral tongues punched from intermediate portions of metal of two opposite sides of said frame to secure wire mesh to said sash, each tongue being bent to concavo-convex form in cross-section with the inner side thereof of convex form and also bent at its base away from the surface of the frame whereby when the tongue is in clamping position the central portion of the tip only thereof will cooperate with the frame to engage the wire mesh.

In testimony whereof, I have hereunto set my hand this 2nd day of March, 1928.

JOHN J. RITTER.